(12) United States Patent
Zhang

(10) Patent No.: US 10,856,389 B2
(45) Date of Patent: Dec. 1, 2020

(54) WARNING LIGHT SCINTILLATION INTENSITY CONTROL PLATFORM

(71) Applicant: YUYAO FEITE PLASTIC CO., LTD., Yuyao, Zhejiang Province (CN)

(72) Inventor: Shanqin Zhang, Yuyao (CN)

(73) Assignee: YUYAO FEITE PLASTIC CO., LTD., Yuyao (CN)

( * ) Notice: Subject to any disclaimer, the term of this patent is extended or adjusted under 35 U.S.C. 154(b) by 348 days.

(21) Appl. No.: 15/770,010

(22) PCT Filed: Jun. 30, 2017

(86) PCT No.: PCT/CN2017/091144
§ 371 (c)(1),
(2) Date: Apr. 20, 2018

(87) PCT Pub. No.: WO2018/223451
PCT Pub. Date: Dec. 13, 2018

(65) Prior Publication Data
US 2020/0245436 A1    Jul. 30, 2020

(30) Foreign Application Priority Data
Jun. 6, 2017  (CN) .......................... 2017 1 0418639

(51) Int. Cl.
*H05B 47/11*  (2020.01)
*G06T 5/00*  (2006.01)
(Continued)

(52) U.S. Cl.
CPC .............. *H05B 47/11* (2020.01); *G06T 5/002* (2013.01); *G08B 5/38* (2013.01); *B60Q 1/2611* (2013.01); *G06T 2207/20032* (2013.01)

(58) Field of Classification Search
None
See application file for complete search history.

(56) References Cited

U.S. PATENT DOCUMENTS 6,351,211 B1 *  2/2002  Bussard ................. B60Q 1/302
                                                    340/438
2007/0273551 A1   11/2007  Jacobs et al.
(Continued)

FOREIGN PATENT DOCUMENTS

CN           2703952 Y       6/2005
CN         200993327 Y      12/2007
(Continued)

OTHER PUBLICATIONS

International Search Report issued in International Application No. PCT/CN2017/091144, dated Feb. 28, 2018.
(Continued)

*Primary Examiner* — Brent Swarthout
(74) *Attorney, Agent, or Firm* — Charles C. Achkar; Ostrolenk Faber LLP.

(57) ABSTRACT

A warning light scintillation intensity control platform includes a cylindrical mounting base, a scintillation driver, a monochromatic light emitting device, a haze detection device, a CCD sensing device and an STM32 control chip. The cylindrical mounting base is configured to fix the monochromatic light emitting device on a police car. The scintillation driver is connected with the monochromatic light emitting device for controlling a light emission mode of the monochromatic light emitting device. The haze detection device is used for detecting the present haze concentration. The CCD sensing device is used to output a surrounding image of the police car. The STM32 control chip is respectively connected with the scintillation driver, the haze detection device and the CCD sensing device and is used for sending a scintillation control signal to the scintillation driver. According to the present invention, the warning effect of the warning light can be improved.

9 Claims, 1 Drawing Sheet

1 – cylindrical mounting base
2 – scintillation driver
3 – monochromatic light emitting device
4 – haze detection device
5 – CCD sensing device
6 – STM32 control chip

(51) Int. Cl.
  *G08B 5/38* (2006.01)
  *B60Q 1/26* (2006.01)

(56) References Cited

U.S. PATENT DOCUMENTS

| | | | |
|---|---|---|---|
| 2012/0206050 A1* | 8/2012 | Spero | F21V 23/0464 |
| | | | 315/152 |
| 2017/0050555 A1* | 2/2017 | Chen | F21S 41/635 |
| 2017/0075888 A1 | 3/2017 | Ekin | |

FOREIGN PATENT DOCUMENTS

| | | |
|---|---|---|
| CN | 103065133 A | 4/2013 |
| CN | 105512623 A | 4/2016 |

OTHER PUBLICATIONS

Written Opinion of the International Searching Authority issued in International Application No. PCT/CN2017/091144, dated Feb. 28, 2018.

* cited by examiner

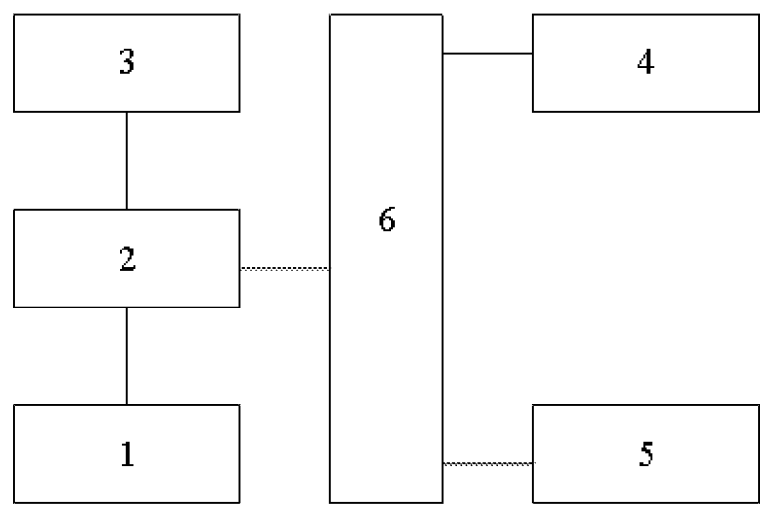
1 – cylindrical mounting base
2 - scintillation driver
3 – monochromatic light emitting device
4 – haze detection device
5 – CCD sensing device
6 – STM32 control chip

WARNING LIGHT SCINTILLATION INTENSITY CONTROL PLATFORM

CROSS REFERENCE TO RELATED APPLICATIONS

The present application is a § 371 National Phase application based on PCT/CN2017/091144 filed Jun. 30, 2017, which claims the benefit of Chinese application No. 201710418639.5 filed Jun. 6, 2017, the subject matter of each of which is incorporated by reference in their entirety.

FIELD OF THE INVENTION

The present invention relates to a warning light, and more particularly to a warning light scintillation intensity control platform is provided.

BACKGROUND OF THE INVENTION

Warning lights are widely used in various special places for warning signs, and may be suitable for municipal and construction operations and guardianship, first-aid, rescue workers as signal contact and direction instructions. In general, warning lights are mainly applied to police cars for warning the passing vehicles and pedestrians to dodge and for providing a deterrent effect for the arrested criminals as well as a sense of security for the masses so as to avoid imminent wrongful acts.

In the prior art, the scintillation intensity of the warning light is fixed, and the scintillation intensity cannot be adaptively adjusted according to the nearest car distance, not to mention that the scintillation intensity of the warning light is automatically increased in heavy haze weather, so that the nearest car in front of the police car cannot know the rear police car to get out of the way. Accordingly, the inventor of the present invention has devoted himself based on his many years of practical experiences to solve these problems.

SUMMARY OF THE INVENTION

In order to solve the above problem, the present invention provides a warning light scintillation intensity control platform. Based on the real-time haze concentration, the image in front of a police car is performed with haze removal treatment to obtain a haze removal image. Based on a reference car body profile, the haze removal image is performed with the nearest car body detection to obtain a nearest car body sub-image by segmenting the haze removal image. Based on the nearest car distance, the scintillation intensity sent to a scintillation driver is determined for controlling a monochromatic light emitting device to perform monochromatic light emission according to the scintillation intensity sent to the scintillation driver.

According to one aspect of the present invention, a warning light scintillation intensity control platform is provided. The warning light scintillation intensity control platform comprises a cylindrical mounting base, a scintillation driver, a monochromatic light emitting device, a haze detection device, a CCD sensing device and an STM32 control chip. The cylindrical mounting base is configured to fix the monochromatic light emitting device on a police car. The scintillation driver is connected with the monochromatic light emitting device for controlling a light emission mode of the monochromatic light emitting device. The haze detection device is used for detecting the present haze concentration. The CCD sensing device is used to output a surrounding image of the police car. The STM32 control chip is respectively connected with the scintillation driver, the haze detection device and the CCD sensing device and is used for sending a scintillation control signal to the scintillation driver.

Preferably, the scintillation driver and the STM32 control chip are disposed in a front dashboard of the police car. The haze detection device is disposed on a car body of the police car.

Preferably, the monochromatic light emitting device emits red visible light and has a constant light emission mode, a flashing light emission mode and a sharp flashing light emission mode.

Wherein, when the monochromatic light emitting device is in the flashing light emission mode, its light-emitting frequency is within a preset frequency range.

Preferably, the warning light scintillation intensity control platform further comprises a brightness detection device, a contrast enhancement device, a mean square error detection device, a signal-to-noise ratio detection device, an improved median filter device, a Gaussian filter device, and a car recognition device.

The brightness detection device is disposed on the roof of the police car and in the vicinity of the CCD sensing device for detecting and outputting real-time brightness.

The haze detection device is connected with the brightness detection device for receiving the real-time brightness. The haze concentration detected by the haze detection device is corrected based on the real-time brightness. The corrected haze concentration is output as a real-time haze concentration.

The contrast enhancement device is connected with the CCD sensing device, and is used for receiving the surrounding image of the police car and performing contrast enhancement processing on the surrounding image of the police car to obtain an enhanced image. The mean square error detection device is used for receiving the enhanced image. Based on pixel values of respective pixels of the enhanced image, a mean square error of the pixel values of the enhanced image is determined as a target mean square error to be output.

The signal-to-noise ratio detection device is used for receiving the enhanced image and performing a noise analysis on the enhanced image to obtain a primary noise signal with maximum noise amplitude and a secondary noise signal with secondary noise amplitude. Based on the primary noise signal, the secondary noise signal and the enhanced image, the signal-to-noise ratio of the enhanced image is determined to be output as a target signal-to-noise ratio. The signal-to-noise ratio detection device is further used for performing a scene judgment on the enhanced image to determine the distribution of the pixel values of the pixels of the enhanced image. A pixel value analysis is performed on each of the pixels of the enhanced image based on the distribution to determine whether they are noise pixels. The noise pixels of the enhanced image compose a plurality of noise regions. The area and the shape of each of the noise regions are determined. The areas of the noise regions are summed to obtain the total area of the noise regions.

The improved median filter device is respectively connected with the mean square error detection device and the signal-to-noise ratio detection device. When the target signal-to-noise ratio is less than or equal to a preset signal-to-noise ratio threshold and the target mean square error is greater than or equal to a preset mean square error threshold, the improved median filter device enters a working state from a power saving state and receives the shape of each of the noise regions. Each of the noise regions is divided into a plurality of reference sub-regions based on geometric features of the shape of each of the noise regions. Each of the reference sub-regions has a square, circular or linear shape. For each of the noise regions, for each of the divided reference sub-regions, a corresponding median filter template is selected to perform median filtering to obtain a filter pattern of each of the sub-regions. The filter pattern of each of the sub-regions is combined into a filtered noise region sub-image. A non-noise region of the enhanced image is combined with each noise region sub-image to obtain a median filter image.

The Gaussian filter device is respectively connected with the improved median filter device, the mean square error detection device and the signal-to-noise ratio detection device. When the target signal-to-noise ratio is less than or equal to the preset signal-to-noise ratio threshold and the target mean square error is greater than or equal to the preset mean square error threshold, the Gaussian filter device enters the working state from the power saving state and receives the median filter image and performs Gaussian filter processing on the median filter image to obtain a Gaussian filter image.

The car recognition device is respectively connected with the haze detection device and the Gaussian filter device for receiving the Gaussian filter image. Based on the real-time haze concentration, the Gaussian filter image is performed with haze removal treatment to obtain a haze removal image. Based on a reference car body profile, the haze removal image is performed with the nearest car body detection to obtain a nearest car body sub-image by segmenting the haze removal image.

Wherein, in the enhanced image, the region outside the plurality of noise regions is the non-noise region.

Wherein, the distribution of the pixel values of the pixels of the enhanced image includes determining, for each of the pixels in the region of the enhanced image, a pixel value range to which the pixel value of the pixel belongs.

Wherein, the STM32 control chip is further connected with the car body identification device for determining and outputting a nearest car distance based on the depth of field in the haze removal image based on a car body target corresponding to the nearest car body sub-image.

Wherein, the STM32 control chip is further configured to determine scintillation intensity sent to the scintillation driver based on the nearest car distance for controlling the monochromatic light emitting device to perform monochromatic light emission according to the scintillation intensity sent to the scintillation driver.

Preferably, when the shape of the reference sub-regions is a square, the size of each reference sub-regions is 3×3, 5×5 or 7×7. When the shape of the reference sub-regions is a circle, the radius of each reference sub-region is 3 pixels, 5 pixels or 7 pixels. When the shape of the reference sub-regions is linear, each reference sub-region is a one-dimensional pixel set.

Preferably, the warning light scintillation intensity control platform further comprises a vehicle-mounted hard disk connected to a filter switching device for storing the preset signal-to-noise ratio threshold and the preset mean square error threshold.

Preferably, the vehicle-mounted hard disk adopts rubber shock absorption.

Preferably, the vehicle-mounted hard disk adopts steel wire shock absorption.

Preferably, the vehicle-mounted hard disk adopts electronic suspension.

BRIEF DESCRIPTION OF THE DRAWINGS

The embodiments of the present invention will be described below with reference to the accompanying drawings, in which:

FIG. 1 is a structural block diagram of a warning light scintillation intensity control platform according to an embodiment of the present invention. The warning light scintillation intensity control platform comprises a cylindrical mounting base 1, a scintillation driver 2, a monochromatic light emitting device 3, a haze detection device 4, a CCD sensing device 5, and an STM32 control chip 6.

DETAILED DESCRIPTION OF THE PREFERRED EMBODIMENTS

An embodiment of a warning light scintillation intensity control platform of the present invention will be described in detail below with reference to the accompanying drawings.

Warning lights, as implied by the name, play a warning reminder role. They are generally used to maintain road safety and effectively reduce traffic accidents. They can also prevent potential unsafe hidden dangers. Under normal circumstances, warning lights are usually used for police cars, construction vehicles, fire engines, ambulances, precaution management vehicles, road maintenance vehicles, tractors, emergency A/S vehicles, machinery equipment, and the like.

Under normal circumstances, warning lights may have a variety of lengths depending on the vehicle type and use and are provided with a lampshade. When required, the lampshade may be combined with composite colors. Warning lights are classified as light bulb rotating lights, LED flash lights, and xenon strobe tube lights according to different light sources. Compared with light bulb rotating lights, LED flash lights have the advantages of long service life, energy saving and lower heat.

The scintillation intensity of a conventional warning light is fixed or needs to be manually adjusted. The working mode is too rigid, and the judgment is too dependent on the manual operation of police personnel. As a result, the working efficiency of the warning light is not high enough to warn the passing vehicles effectively. In order to overcome the above shortcomings, the present invention provides a warning light scintillation intensity control platform for solving the above technical problems.

FIG. 1 is a structural block diagram of a warning light scintillation intensity control platform according to an embodiment of the present invention. The warning light scintillation intensity control platform comprises a cylindrical mounting base 1, a scintillation driver 2, a monochromatic light emitting device 3, a haze detection device 4, a CCD sensing device 5, and an STM32 control chip 6. The cylindrical mounting base is configured to fix the monochromatic light emitting device on a police car. The scintillation driver is connected with the monochromatic light emitting device for controlling a light emission mode of the monochromatic light emitting device. The haze detection device is used for detecting the present haze concentration. The CCD sensing device is used to output a surrounding image of the police car. The STM32 control chip is respectively connected with the scintillation driver, the haze detection device and the CCD sensing device, and is used for sending a scintillation control signal to the scintillation driver.

Next, the specific structure of the warning light scintillation intensity control platform of the present invention will be further described.

In addition, in the warning light scintillation intensity control platform, both the scintillation driver and the STM32 control chip are disposed in the front dashboard of the police car, and the haze detection device is disposed on the car body of the police car.

In the warning light scintillation intensity control platform, the monochromatic light emitting device emits red visible light and has a constant light emission mode, a flashing light emission mode and a sharp flashing light emission mode.

Wherein, when the monochromatic light emitting device is in the flashing light emission mode, its light-emitting frequency is within a preset frequency range.

The warning light scintillation intensity control platform may further comprise a brightness detection device disposed on the roof of the police car and in the vicinity of the CCD sensing device for detecting and outputting real-time brightness.

The haze detection device is connected with the brightness detection device for receiving the real-time brightness. The haze concentration detected by the haze detection device is corrected based on the real-time brightness, and the corrected haze concentration is output as a real-time haze concentration.

A contrast enhancement device is connected with the CCD sensing device for receiving the surrounding image of the police car and performing contrast enhancement processing on the surrounding image of the police car to obtain an enhanced image.

A mean square error detection device is used for receiving the enhanced image. Based on the pixel values of the respective pixels of the enhanced image, the mean square error of the pixel values of the enhanced image is determined as a target mean square error to be output.

A signal-to-noise ratio detection device is used for receiving the enhanced image and performing a noise analysis on the enhanced image to obtain a primary noise signal with the maximum noise amplitude and a secondary noise signal with the secondary noise amplitude. Based on the primary noise signal, the secondary noise signal and the enhanced image, the signal-to-noise ratio of the enhanced image is determined to be output as a target signal-to-noise ratio. The signal-to-noise ratio detection device is further used for performing a scene judgment on the enhanced image to determine the distribution of the pixel values of the pixels of the enhanced image. A pixel value analysis is performed on each of the pixels of the enhanced image based on the distribution to determine whether they are noise pixels. The noise pixels of the enhanced image compose a plurality of noise regions. The area and the shape of each of the noise regions are determined. The areas of the noise regions are summed to obtain the total area of the noise regions.

An improved median filter device is respectively connected with the mean square error detection device and the signal-to-noise ratio detection device. When the target signal-to-noise ratio is less than or equal to a preset signal-to-noise ratio threshold and the target mean square error is greater than or equal to a preset mean square error threshold, the improved median filter device enters a working state from a power saving state and receives the shape of each noise region. Each of the noise regions is divided into a plurality of reference sub-regions based on the geometric features of the shape of each of the noise regions. Each of the reference sub-regions has a square, circular or linear shape. For each noise region, for each of the divided reference sub-regions, a corresponding median filter template is selected to perform median filtering to obtain a filter pattern of each sub-region. The filter pattern of each sub-region is combined into a filtered noise region sub-image. The non-noise region of the enhanced image is combined with each noise region sub-image to obtain a median filter image.

A Gaussian filter device is respectively connected with the improved median filter device, the mean square error detection device and the signal-to-noise ratio detection device. When the target signal-to-noise ratio is less than or equal to the preset signal-to-noise ratio threshold and the target mean square error is greater than or equal to the preset mean square error threshold, the Gaussian filter device enters the working state from the power saving state and receives the median filter image and performs Gaussian filter processing on the median filter image to obtain a Gaussian filter image.

A car recognition device is respectively connected with the haze detection device and the Gaussian filter device for receiving the Gaussian filter image. Based on the real-time haze concentration, the Gaussian filter image is performed with haze removal treatment to obtain a haze removal image. Based on a reference car body profile, the haze removal image is performed with the nearest car body detection to obtain a nearest car body sub-image by segmenting the haze removal image.

Wherein, in the enhanced image, the region outside the plurality of noise regions is a non-noise region.

Wherein, the distribution of the pixel values of the pixels in the enhanced image includes determining, for each pixel in the region of the enhanced image, a pixel value range to which the pixel value of the pixel belongs.

Wherein, the STM32 control chip is further connected with the car body identification device for determining and outputting a nearest car distance based on the depth of field in the haze removal image based on a car body target corresponding to the nearest car body sub-image.

Wherein, the STM32 control chip is further configured to determine the scintillation intensity sent to the scintillation driver based on the nearest car distance for controlling the monochromatic light emitting device to perform monochromatic light emission according to the scintillation intensity sent to the scintillation driver.

In addition, in the warning light scintillation intensity control platform, when the shape of the reference sub-region is a square, the size of each reference sub-region is 3×3, 5×5 or 7×7. When the shape of each reference sub-region is a circle, the radius of each reference sub-region is 3 pixels, 5 pixels or 7 pixels. When the shape of the reference sub-region is linear, each reference sub-region is a one-dimensional pixel set.

The warning light scintillation intensity control platform may further include a vehicle-mounted hard disk connected to the filter switching device for storing the preset signal-to-noise ratio threshold and the preset mean square error threshold.

In addition, in the warning light scintillation intensity control platform, the vehicle-mounted hard disk may adopt rubber shock absorption.

In addition, in the warning light scintillation intensity control platform, the vehicle-mounted hard disk may adopt steel wire shock absorption.

In addition, in the warning light scintillation intensity control platform, the vehicle-mounted hard disk may adopt electronic suspension.

Wherein, the image filtering is to suppress the noise of the target image while preserving the detailed characteristics of the image as much as possible, which is an indispensable operation in image preprocessing, and its processing effect will directly affect the effectiveness and reliability of the processing and analysis of the follow-up image.

Due to imperfect imaging systems, transmission media and recording equipment, digital images are often contaminated with various noises in their formation and transmission records. In addition, in the image processing, noises are also introduced into the resulting image when the input image object is not as expected. These noises often appear on the image as isolated pixels or blocks of pixels that give a strong visual effect. In general, the noise signal is not relevant to the object to be studied. It appears as useless information that disrupts the observable information of the image. For digital image signals, the noise table has large or small extremums. These extremums act on the true gray values of the image pixels by addition and subtraction, causing bright and dark points to interfere with the image, reducing the image quality greatly, affecting image recovery, segmentation, feature extraction, image recognition and other follow-up work. In order to construct a filter that effectively suppresses noise, two basic issues must be considered: the noise in the target and the background can be effectively removed; meanwhile, the shape, size and specific geometry and topological features of the image object can be well protected.

One of the common image filtering modes is a non-linear filter. Generally speaking, when the signal spectrum and the noise spectrum are aliased or when the signal contains non-additive noise, there will be noise caused by the non-linearity of the system or non-Gaussian noise. Traditional linear filtering techniques, such as Fourier transform, always filter out the noise and blur the image details (such as edges) in a certain way, leading to the reduction of the positioning accuracy of linear features and the extractability of features. A non-linear filter is based on a non-linear mapping relationship of input signals and can often map a particular noise to approximately zero while preserving the important characteristics of the signal, so it can overcome the shortcomings of the linearity filter.

In order to solve the technical problem that it is difficult to adaptively control the scintillation intensity of the warning light in the prior art, a plurality of processing devices are integrated into the existing warning light hardware to acquire the image in front of the police vehicle according to the warning light scintillation intensity control platform of the present invention. The acquired image can be effectively performed haze removal to identify the front car so as to obtain the nearest car distance in front of the police car and to automatically adjust the scintillation intensity of the warning light based on the front nearest car distance.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A warning light scintillation intensity control platform, comprising a cylindrical mounting base, a scintillation driver, a monochromatic light emitting device, a haze detection device, a CCD (charge-coupled device) sensing device and an STM32 control chip, the cylindrical mounting base being configured to fix the monochromatic light emitting device on a police car, the scintillation driver being connected with the monochromatic light emitting device for controlling a light emission mode of the monochromatic light emitting device, the haze detection device being used for detecting a present haze concentration, the CCD sensing device being used to output a surrounding image of the police car, the STM32 control chip being respectively connected with the scintillation driver, the haze detection device and the CCD sensing device and being used for sending a scintillation control signal to the scintillation driver.

2. The warning light scintillation intensity control platform as claimed in claim 1, wherein the scintillation driver and the STM32 control chip are disposed in a front dashboard of the police car, and the haze detection device is disposed on a car body of the police car.

3. The warning light scintillation intensity control platform as claimed in claim 2, wherein the monochromatic light emitting device emits red visible light and has a constant light emission mode, a flashing light emission mode and a sharp flashing light emission mode;
wherein when the monochromatic light emitting device is in the flashing light emission mode, its light-emitting frequency is within a preset frequency range.

4. The warning light scintillation intensity control platform as claimed in claim 3, further comprising:
a brightness detection device, disposed on the roof of the police car and in the vicinity of the CCD sensing device for detecting and outputting real-time brightness;
the haze detection device being connected with the brightness detection device for receiving the real-time brightness, the haze concentration detected by the haze detection device being corrected based on the real-time brightness, the corrected haze concentration being output as a real-time haze concentration;
a contrast enhancement device, connected with the CCD sensing device, being used for receiving the surrounding image of the police car and performing contrast enhancement processing on the surrounding image of the police car to obtain an enhanced image;
a mean square error detection device, used for receiving the enhanced image, based on pixel values of respective pixels of the enhanced image, a mean square error of the pixel values of the enhanced image being determined as a target mean square error to be output;
a signal-to-noise ratio detection device, used for receiving the enhanced image and performing a noise analysis on the enhanced image to obtain a primary noise signal with maximum noise amplitude and a secondary noise signal with secondary noise amplitude, based on the primary noise signal, the secondary noise signal and the enhanced image, the signal-to-noise ratio of the enhanced image being determined to be output as a target signal-to-noise ratio, the signal-to-noise ratio detection device being further used for performing a scene judgment on the enhanced image to determine the distribution of the pixel values of the pixels of the enhanced image, a pixel value analysis being performed on each of the pixels of the enhanced image based on the distribution to determine whether they are noise pixels, the noise pixels of the enhanced image composing a plurality of noise regions, the area and the shape of each of the noise regions being determined, the areas of the noise regions being summed to obtain the total area of the noise regions;
an improved median filter device, respectively connected with the mean square error detection device and the signal-to-noise ratio detection device, wherein when the target signal-to-noise ratio is less than or equal to a preset signal-to-noise ratio threshold and the target mean square error is greater than or equal to a preset mean square error threshold, the improved median filter device enters a working state from a power saving state and receives the shape of each of the noise regions, each of the noise regions is divided into a plurality of reference sub-regions based on geometric features of the shape of each of the noise regions, each of the reference sub-regions has a square, circular or linear shape, for each of the noise regions, for each of the divided reference sub-regions, a corresponding median filter template is selected to perform median filtering to obtain a filter pattern of each of the sub-regions, the filter pattern of each of the sub-regions is combined into a filtered noise region sub-image, a non-noise region of the enhanced image is combined with each noise region sub-image to obtain a median filter image;

a Gaussian filter device, respectively connected with the improved median filter device, the mean square error detection device and the signal-to-noise ratio detection device, wherein when the target signal-to-noise ratio is less than or equal to the preset signal-to-noise ratio threshold and the target mean square error is greater than or equal to the preset mean square error threshold, the Gaussian filter device enters the working state from the power saving state and receives the median filter image and performs Gaussian filter processing on the median filter image to obtain a Gaussian filter image;

a car recognition device, respectively connected with the haze detection device and the Gaussian filter device for receiving the Gaussian filter image, wherein based on the real-time haze concentration, the Gaussian filter image is performed with haze removal treatment to obtain a haze removal image, based on a reference car body profile, the haze removal image is performed with nearest car body detection to obtain a nearest car body sub-image by segmenting the haze removal image;

wherein in the enhanced image, the region outside the plurality of noise regions is the non-noise region;

wherein the distribution of the pixel values of the pixels of the enhanced image includes determining, for each of the pixels in the region of the enhanced image, a pixel value range to which the pixel value of the pixel belongs;

wherein the STM32 control chip is further connected with the car body identification device for determining and outputting a nearest car distance based on the depth of field in the haze removal image based on a car body target corresponding to the nearest car body sub-image;

wherein the STM32 control chip is further configured to determine scintillation intensity sent to the scintillation driver based on the nearest car distance for controlling the monochromatic light emitting device to perform monochromatic light emission according to the scintillation intensity sent to the scintillation driver.

5. The warning light scintillation intensity control platform as claimed in claim 4, wherein when the shape of the reference sub-regions is a square, the size of each reference sub-regions is 3×3, 5×5 or 7×7; when the shape of the reference sub-regions is a circle, the radius of each reference sub-region is 3 pixels, 5 pixels or 7 pixels; when the shape of the reference sub-regions is linear, each reference sub-region is a one-dimensional pixel set.

6. The warning light scintillation intensity control platform as claimed in claim 5, further comprising a vehicle-mounted hard disk connected to a filter switching device for storing the preset signal-to-noise ratio threshold and the preset mean square error threshold.

7. The warning light scintillation intensity control platform as claimed in claim 6, wherein the vehicle-mounted hard disk adopts rubber shock absorption.

8. The warning light scintillation intensity control platform as claimed in claim 6, wherein the vehicle-mounted hard disk adopts steel wire shock absorption.

9. The warning light scintillation intensity control platform as claimed in claim 6, wherein the vehicle-mounted hard disk adopts electronic suspension.

\* \* \* \* \*